March 5, 1968
R. E. PARISIEN
3,371,911
CHAIN LINK FABRIC FASTENER
Filed April 4, 1966
2 Sheets-Sheet 1
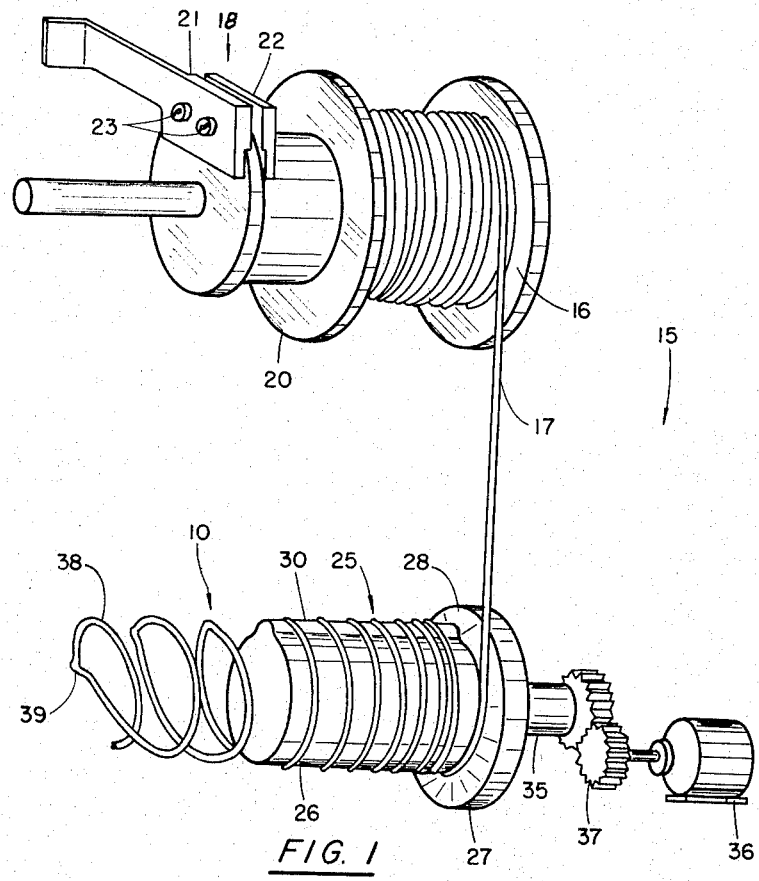
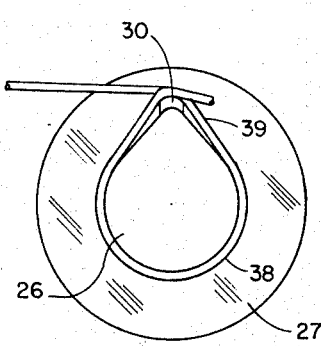
FIG. 2
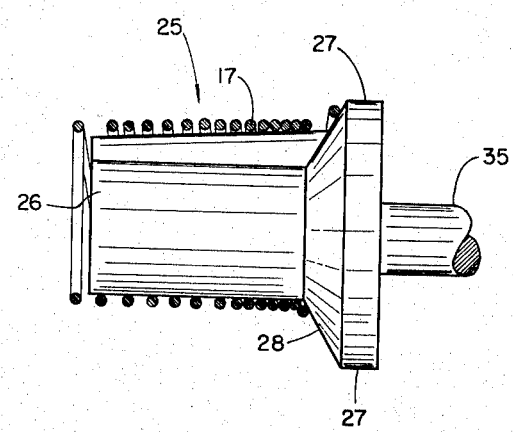
FIG. 3 ns" United States Patent Office 3,371,911
Patented Mar. 5, 1968

3,371,911
CHAIN LINK FABRIC FASTENER
Rudolph Edgar Parisien, Box 807, Montreal Road,
R.R. 1, Ottawa, Ontario, Canada
Filed Apr. 4, 1966, Ser. No. 539,905
Claims priority, application Canada, Mar. 15, 1966,
954,746
2 Claims. (Cl. 256—47)

ABSTRACT OF THE DISCLOSURE

A fastener for securing chain link fence to a supporting post, the fastener being in the form of a helix, each coil of which has an extended portion to engage the mesh of the chain link fence. The fastener is inserted over the upper end of the post in the manner of a cork-screw while a free lower end is guided through successive adjacent meshes of the chain link fence.

---

This invention relates to fasteners and more particularly a fastener for use in securing a wire mesh fence to a support.

Known fasteners for use in fence installations are disadvantageous in that a number of parts are required including nuts and bolts or clips which are easily misplaced, relatively expensive to manufacture and time consuming to assemble.

It is therefore an object of this invention to provide a fastener which consists of a single element and which can be simply and easily manufactured and shipped at a relatively low cost.

A further object is the provision of a unitary fastener which can be quickly and easily installed without the use of special tools.

A still further object is the provision of a fastener which is relatively tamper proof and which may be provided with improved durability without any substantial increase in cost.

Accordingly the present invention provides a fastener for use in securing wire mesh fencing to supporting posts said fasteners comprising a helix each coil of which defines a substantially semi-circular portion having a substantially V-shaped portion extending therefrom so that the legs of the V extend tangentially with respect to the semi-circular portion.

The present invention further provides a method of securing a wire mesh fence to a supporting post said method comprising, positioning the fencing adjacent the said post, inserting a helical wire fastener over an upper end of said post, imparting axial rotation to said helical fastener, guiding a lower free end of said fastener so as to thread it through the meshes of said wire fence as said helical fastener is rotated and moved downwardly on said post.

In the drawings which illustrate an embodiment of the invention:

FIG. 1 is a diagrammatic perspective view of a fastener in accordance with this invention and illustrating an apparatus for producing the fastener.

FIG. 2 is a side elevational view of the apparatus of FIG. 1 and a sectional view of the fastener.

FIG. 3 is an end elevational view of a portion of the apparatus of FIG. 2.

Figure 4:
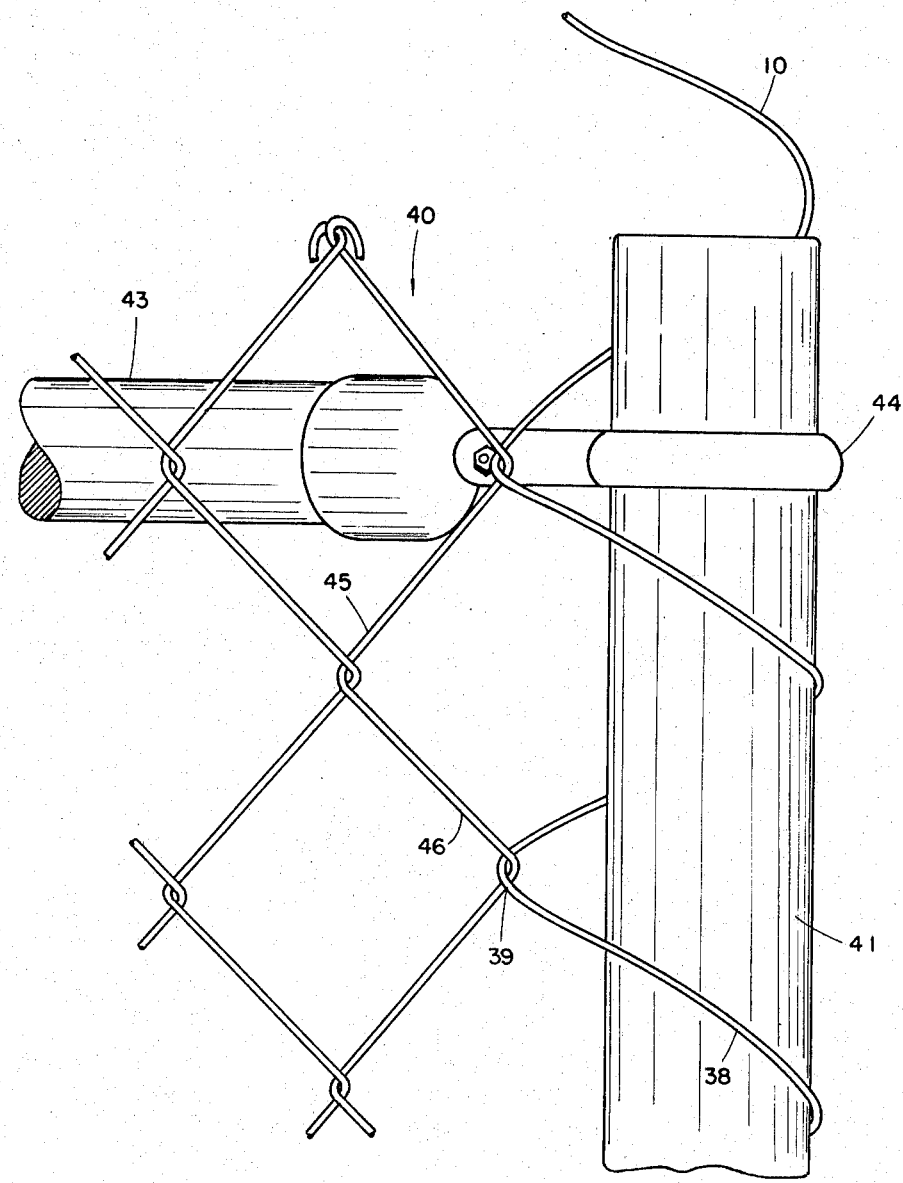
FIG. 4 is a fragmentary perspective view of a section of fence secured to a supporting post by the fastening means of this invention.

Referring now in detail to the drawings a helical fastener for wire mesh fences is indicated generally by numeral 10 in FIG. 1. An apparatus for forming the wire fastener 10 is indicated generally by numeral 15 and includes a rotatable reel 16 on which wire 17 is stored and which is subjected to brake action by a brake shoe 18 acting on a brake disc 20.

The brake shoe 18 comprises two sections 21 and 22 adapted to receive the brake disc 20 therebetween. Bolts 23 passing through the brake sections 21 and 22 are provided with suitable wing nuts or the like for adjusting the friction imparted by the brake shoe 18 in a well known manner. The wire then passes to a mandrel 25 on which it is wound.

The mandrel 25 includes a cylindrical portion 26 and an integral flange 27 at one end thereof. An adjacent side face 28 of the flange 27 tapers toward the cylindrical portion 26. This cylindrical portion 26 is also provided with an integral longitudinally extending ridge 30. It will be noted that the ridge 30 extends from the tapered side face 28 of the flange 27 to the other end of the cylindrical portion 26 so as to taper toward the end remote from the flange 27.

The mandrel 25 also includes a concentric axially extending shaft 35 secured to the flange 27 and journalled for rotation in suitable support means (not shown). Rotary motion is imparted to the shaft 35 as by an electric motor 36 through suitable reduction gears 37.

The reel 16 is positioned relative to the mandrel 25 so that wire 17 drawn therefrom engages the side face 28 initially as it is wound on the mandrel 25. Each successive turn of the wire causes the first turn to move away from the flange 27 in a manner to be described more fully below.

In operation, a first turn of the wire 17 drawn from the reel 16 having been wrapped on the mandrel 25 as illustrated in FIG. 3, the mandrel 25 is rotated by the motor 36 and wire withdrawn from the reel 16 is wound on the mandrel 25. The drag applied by the brake shoe 18 on the disc 20 creates tension in the wire 17 so that the wire 17 follows the periphery of the cylindrical portion 26 and ridge 30. The first coil will be disposed against the flange 27 and as each successive coil is wound on the mandrel 25, the preceding coils move away from the flange 28 due to the wire being forced down the side face 28 of the flange 27.

The coils are also released from the mandrel 25 as they move toward the mid portion of the mandrel due to the taper of the ridge 30 which provides a lesser effective diameter remote from the flange 27. The taper of the ridge 30 may vary to suit the wire used for forming the fastener 10.

The continuous helical wire fastener 10 is then cut into convenient lengths or otherwise prepared for shipment or storage.

The fastener 10 so formed comprises a helix each coil of which defines a substantially semi-circular portion 38 having a substantially V shaped portion 39 extending therefrom.

The fastener 10 may be formed of any suitable wire preferably one with a corrosion resistant coating of for example plastic.

The helical fastener 10 is shown partially installed in a typical wire mesh fence construction 40 illustrated in FIG. 4. The fence 40 includes a supporting post 41 and a horizontal rail 43 secured thereto by a suitable clamp 44. Conventional wire mesh 45 is positioned adjacent the post 41. It will be appreciated that a stretching tool would possibly be employed to move the wire mesh close to the post during installation of the fastener 10 and that after the mesh is released it will assume the relative position illustrated in FIG. 4.

In use the helical fastener 10 is inserted over the upper end of the post 41 and the fastener 10 turned in corkscrew fashion while a free lower end of the fastener 10 is threaded through the meshes 46 of the wire mesh 45 immediately adjacent the post 41.

When the fastener 10 is properly positioned with respect to the wire mesh 45 and the post 41, the semi-cylindrical portion 38 of each coil of the helix will be engaging the post 41 and the associated V shaped portion 39 will be engaged in the meshes 46. The fastener is then cut to the correct length if necessary and the free ends tied to adjacent meshes 46 in any convenient manner.

The V shaped portions 39 provide a convenient means to quickly and easily align each coil of the helix with an associated mesh 46 so as to provide a neat appearance.

The embodiments of the invention in which an exclusive property or privilege is claimed are defined as follows:

1. A fastener for use in securing wire mesh fencing to supporting posts said fasteners comprising a helix each coil of which defines a substantially semi-circular portion having a substantially V shaped portion extending therefrom so that the legs of the V extend tangentially with respect to the semi-circular portion.

2. In combination a fastener securing wire mesh fencing to a supporting post, said fastener comprising a helix, each coil of which defines a semi-circular portion having a substantially V shaped portion extending therefrom so that the legs of the V extend tangentially with respect to the semi-circular portion, said fastener on being inserted over an upper end of said post and turned about its longitudinal axis and having a lower free end thereof guided through adjacent meshes of said fence as said fastener is moved downwardly on said post is so positioned that said V shaped portions engage said wire mesh fencing and said semi-circular portions engage said post.

References Cited

UNITED STATES PATENTS 2,836,397   5/1958   Morrissey _____ 256—47 X

DAVID J. WILLIAMOWSKY, *Primary Examiner.*

DAVID L. TAYLOR, *Assistant Examiner.*